United States Patent [19]

Shimirak et al.

[11] Patent Number: 5,601,460
[45] Date of Patent: *Feb. 11, 1997

[54] GEL FILLED MODULAR ELECTRICAL CONNECTING BLOCK

[75] Inventors: Gerald L. Shimirak, Danville; Jackie Thomas, Sunnyvale; Miguel Morales; Yogendra S. Dhanik, both of Fremont; Darcey Messner, Sunnyvale, all of Calif.

[73] Assignee: Raychem Corporation, Menlo Park, Calif.

[ * ] Notice: The term of this patent shall not extend beyond the expiration date of Pat. No. 5,376,019.

[21] Appl. No.: 411,449

[22] Filed: Mar. 28, 1995

Related U.S. Application Data

[62] Division of Ser. No. 286,763, Aug. 5, 1994, Pat. No. 5,427,547, which is a division of Ser. No. 6,917, Jan. 22, 1993, Pat. No. 5,376,019, which is a continuation-in-part of Ser. No. 802,950, Dec. 3, 1991, Pat. No. 5,246,383, which is a continuation-in-part of Ser. No. 791,749, Nov. 12, 1991, Pat. No. 5,195,125, which is a continuation of Ser. No. 584,325, Sep. 17, 1990, Pat. No. 5,111,497.

[51] Int. Cl.$^6$ .................................................. H01R 13/52
[52] U.S. Cl. ............................................ 439/936; 439/936
[58] Field of Search ..................................... 439/199, 201, 439/204, 519, 521, 936; 174/76, 138 F

[56] References Cited

U.S. PATENT DOCUMENTS

| | | | |
|---|---|---|---|
| 3,020,260 | 2/1962 | Nelson | 260/46.5 |
| 3,522,576 | 8/1970 | Cairns . | |
| 3,922,493 | 11/1975 | Brenig et al. | 179/15 AP |
| 4,046,964 | 9/1977 | Daugherty et al. | 179/15 BF |
| 4,186,986 | 2/1980 | Shoemaker | 439/521 X |
| 4,270,030 | 5/1981 | Brolin et al. | 179/175.2 D |
| 4,380,810 | 4/1983 | Canniff | 370/15 |
| 4,393,491 | 7/1983 | Ashlock et al. | 370/13 |

(List continued on next page.)

FOREIGN PATENT DOCUMENTS

| | | |
|---|---|---|
| 0213874 | 3/1987 | European Pat. Off. . |
| 0299797A2 | 1/1989 | European Pat. Off. . |
| 0319306 | 6/1989 | European Pat. Off. . |
| 0370423 | 5/1990 | European Pat. Off. . |
| 0382646 | 8/1990 | European Pat. Off. . |
| 3823925 | 1/1990 | Germany . |
| 2064270 | 6/1981 | United Kingdom . |
| WO91/01600 | 2/1991 | WIPO . |
| WO91/15038 | 10/1991 | WIPO . |

OTHER PUBLICATIONS

"The Complete Catalog of Voice/Data Connecting Devices and Telecom Apparatus," Copyright 1990, Suttle Apparatus, MN Suttle Apparatus Price List, Feb. 1, 1989.
Kaiser et al., "Digital Two–Wire Local Connection Providing Office Subscribers with Speech, Data and New Teleinformation Services," ISSLS, Mar. 20–24, 1978.
Letter from David C. Bliven to Nynex Material Enterprises dated Jan. 23, 1989 (with Request for Quote).
Wheelock, Inc. advertising materials for "DAML–100".
Pair Gain Technologies, Inc. advertising materials for "Pairgain2 Digital Pair Saver".

(List continued on next page.)

*Primary Examiner*—Khiem Nguyen
*Attorney, Agent, or Firm*—William D. Zahrt, II; Herbert G. Burkard

[57] ABSTRACT

An environmentally protected electrical socket and plug assembly (10) retains environmental security throughout repeated connections and disconnections. The socket and plug assembly includes a socket 100 containing an electrical conductor 85 and adapted to insertably receive a plug 90, an environmental sealant 140 at least partially filling the socket so that the sealant is at least partially displaced from the socket when the plug is inserted into the socket, and an elastomeric containment means 40 having an inset dimple 50 for being outwardly deflected to contain displaced sealant when the plug is inserted into the socket and to urge the sealant back into the socket when the plug is removed.

2 Claims, 9 Drawing Sheets

U.S. PATENT DOCUMENTS

| | | | |
|---|---|---|---|
| 4,417,333 | 11/1983 | Cochennec | 370/66 |
| 4,425,017 | 1/1984 | Chan | 439/201 |
| 4,430,530 | 2/1984 | Kandell et al. | 179/175.2 D |
| 4,595,635 | 6/1986 | Dubrow et al. | 428/447 |
| 4,600,261 | 7/1986 | Debbaut . | |
| 4,634,207 | 1/1987 | Debbaut . | |
| 4,643,924 | 2/1987 | Uken et al. | 428/35 |
| 4,662,692 | 5/1987 | Uken et al. | 439/587 X |
| 4,680,233 | 7/1987 | Camin et al. | 428/424.6 |
| 4,716,183 | 12/1987 | Gamarra et al. | 522/80 |
| 4,718,678 | 1/1988 | Vansant | 277/1 |
| 4,741,709 | 5/1988 | Jervis | 439/521 |
| 4,748,651 | 5/1988 | Collins et al. | 379/27 X |
| 4,777,063 | 10/1988 | Dubrow et al. | 427/44 |
| 4,788,680 | 11/1988 | Kikuchi et al. | 370/68 |
| 4,824,390 | 4/1989 | Crane et al. | 439/271 |
| 4,846,721 | 7/1989 | Debruycker et al. | 439/411 |
| 4,864,725 | 9/1989 | Debbaut | 29/871 |
| 4,865,905 | 9/1989 | Uken | 428/220 |
| 4,917,617 | 4/1990 | Smith | 439/135 |
| 4,924,489 | 5/1990 | Lawrence et al. | 379/29 X |
| 4,924,492 | 5/1990 | Gitlin et al. | 378/93 |
| 4,927,386 | 5/1990 | Neuroth | 439/201 X |
| 4,942,270 | 7/1990 | Gamarra | 174/93 |
| 4,979,209 | 12/1990 | Collins et al. | 379/442 X |
| 4,998,894 | 3/1991 | Gronvall | 439/521 |
| 5,085,597 | 2/1992 | Story et al. | 439/521 |
| 5,111,497 | 5/1992 | Bliven et al. | 379/27 |
| 5,140,746 | 8/1992 | Debbaut | 29/855 |
| 5,376,019 | 12/1994 | Shimirak et al. | 439/521 |

OTHER PUBLICATIONS

Memo from Giorgio Anania to Vern Norviel dated Oct. 19, 1990.

Keptel, Inc. "SNI–2100/2200 Network Interface System Installation Data," Jul. 1987.

Raychem Corporation advertising brochure for "Miniplex Two–In–One Digital Subscriber Multiplexer," Apr. 21, 1990.

Graybar Elec. Co. sales material (transmitted May 30, 1991).

Yokota et al., "Maintenance and Test for the Digital Switching System D70 (D) and Subscriber Lines," *Proceedings of the Inter–National Switching Symposium*, May 7–11, 1984, Florence, IT.

Shimakage et al., "Maintenance System for Digital Local Network," *Review Elect. Comm. Labs.* (1984) 32:307–315.

Hanrahan et al., "Subscriber Line Testing for Digital Switching Offices," *IEEE Trans. Com.* (1981) *COM–29*:1434–1441.

Optilink Corporation, "Pairspan–2 Digital Subscriber Carrier System Product Line Description," Jul. 20, 1989.

Optilink Corporation, "Pairspan–2 Two–Line Digital Carrier System," 1989.

Pacific Bell Request for Quote, Jun. 14, 1989.

"Requirements and Objectives for Digital Added Main Line (DAML)," Pacific Bell PUB L–780057–PB/NB, Issue 1, May 1989.

"Requirements for Compatibility of Telecommunications Equipment with Bell Systems Surveillance and Control Systems," Bell System Technical Reference PUB–49001, Jul. 1982.

"Interface Between Loop Carrier Systems and Loop Testing Systems," Bell Communications Research Technical Reference TR–TSY–000465, Issue 2, Apr. 1987.

GEL FILLED MODULAR ELECTRICAL CONNECTING BLOCK

This is a Rule 60 Division of U.S. Ser. No. 08/286,763, filed Aug. 5, 1994, now U.S. Pat. No. 5,427,547, which is a Rule 60 Division of U.S. Ser. No. 08/006,917, filed Jan. 22, 1993, now U.S. Pat. No. 5,376,019, which is a CIP of U.S. Ser. No. 07/802,950, filed Dec. 3, 1991, now U.S. Pat. No. 5,246,383, which is a CIP of U.S. Ser. No. 07/791,749, filed Nov. 12, 1991, now U.S. Pat. No. 5,195,125, which is a Rule 60 Continuation of U.S. Ser. No. 07/584,325, filed Sep. 17, 1990, now U.S. Pat. No. 5,111,497, all incorporated herein by reference for all purposes.

BACKGROUND OF THE INVENTION

The present invention relates to the field of electrical connectors, especially for telephone communication equipment, and more particularly to environmentally protected modular electrical connections. Most particularly, in one embodiment the present invention provides a method and apparatus for protecting modular telephone jacks from damage due to moisture, environmental pollutants, and corrosion, such as often found in coastal regions, islands, and the like.

Telephone line connections at subscriber locations are commonly made with the RJ11 type of plug and socket connector. These connectors are exemplary of electrical connections susceptible to failure from oxidation, corrosion, humidity, salt, and the like, especially in the presence of a live voltage on the conductors within the connector.

For example, it is sometimes difficult to establish and maintain an adequate environmental seal in a removable male RJ11 plug, particularly when wires lead from the male RJ11 plug. Accordingly, moisture and other environmental contaminants are allowed to enter such plugs, sometimes resulting in corrosion and/or failure of the connection of the tip and ring connections in the socket/plug combination. RJ11 sockets are likewise subject to moisture contamination and corrosion, as well as being subject to dust buildup. In hot, humid environments, such as in Florida and along the Gulf Coast of Texas, failure can occur within several months of installation. Servicing these failures is costly for the consumer or the telephone company.

Sometimes problems have also arisen in connection with test ports for customer telecommunications equipment such as remote terminals at customer facilities, described in the parent application, and the like. It is often desirable to provide an RJ11 connector of the type well known to those of skill in the art, or other such connector, at an external location at subscriber facilities such as a junction box leading to a house or a remote terminal of the type described above. Previously, such access is provided by installing a female RJ11 socket at such locations which is normally connected to a male RJ11 plug. The tip and ring wires (among other wires in some cases) lead from the female RJ11 socket, and connect to tip and ring connections in the male RJ11 plug, thereafter leading into the subscriber facility. When it is desired to connect test equipment to the RJ11 female socket, the plug is removed, and another male RJ11 is inserted into the female socket, thereby providing tip and ring connections for the test equipment. Even though the equipment may be contained in a protective housing, such arrangements are sometimes subject to much of the same moisture/corrosion degradation.

It would, therefore, be desirable to provide an improved method and associated apparatus for protecting plug and socket electrical connectors from the environment. In particular, an environmentally resistant RJ11 plug and socket apparatus as well as a method of making a sealed plug would be especially desired.

SUMMARY OF THE INVENTION

An improved method and apparatus for environmentally protecting electrical connections are disclosed which provide in various embodiments for the previously recited desirable features, as well as many others obvious to the ordinary skilled electrical connection designer after reviewing this disclosure. A preferred embodiment according to one aspect of the present invention provides for an environmentally protected electrical socket and plug assembly that retains electrical stability and environmental security throughout repeated connections and disconnections. For example, in the case of an RJ11, the present invention provides for environmental protection after repeated electrical connections and disconnections of telephone equipment.

An improved socket-and-plug electrical connector and a method of manufacturing a protected plug are disclosed. According to one aspect of the invention an electrical connector includes a socket, containing an electrical conductor, that is adapted to insertably receive a plug, an environmental sealant at least partially filling the socket so that the sealant is at least partially displaced from the socket when the plug is inserted into the socket, and an elastomeric containment means for accommodating displaced sealant when the plug is inserted into the socket and for urging the sealant back into the socket when the plug is removed.

Another aspect of the invention is directed to telephone connectors, such as RJ type sockets, in which the socket contacts are provided by a modular spring-block inserted into the socket. Such a socket may be environmentally protected by forming sealant around a spring-block before inserting the spring-block into the socket.

Yet another aspect of the present invention directed to RJ type telephone sockets that employ a spring-block to provide the female contacts is directed to modifications to the RJ socket housing to improve the sealing performance of a gel filling. Such a modified RJ type socket according to this aspect of the invention is configured to seat the spring-block farther away from an inserted RJ type plug, and has shorter teeth in the internal comb for holding the spring-block contacts; these modifications provide a better passage for gel sealant to flow out of and back into the socket as a plug is inserted and removed. Other embodiments of an improved socket according to this aspect of the invention are configured to seat the spring-block back from the front of the socket so a gel-filled well is formed in front of the spring-block, and has a notch along a major portion of an edge, closest to the spring block, of the opening for the RJ plug; these modifications reducing the shearing of the front edge of the gel by an inserted plug, and improve the ability of the gel to return to cover the socket contacts when the plug is removed after repeated insertions and removals.

A further understanding of the nature and advantages of the invention may be had with reference to the following figures and description.

DETAILED DESCRIPTION OF THE PREFERRED EMBODIMENTS

Figure 1:
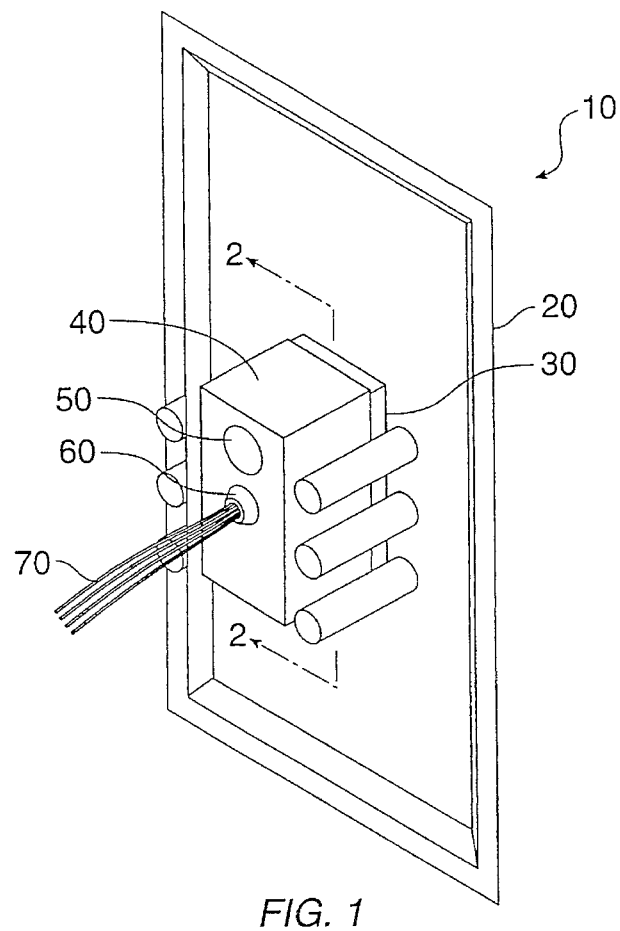
FIG. 1 is rear perspective view of an RJ11 wall socket embodiment of the present invention.

An RJ11 wall socket assembly 10 according to the present invention is illustrated by a rear perspective view in FIG. 1. The wall socket assembly 10 includes a faceplate 20 and a rear socket housing 30. Only a portion of the rear socket housing 30 is visible in FIG. 1, as it is predominantly covered by an elastomeric containment diaphragm 40. The elastomeric diaphragm 40 features an inset dimple 50, discussed further below, and a wire passage 60 through which telephone wires 70 pass.

Figure 2:
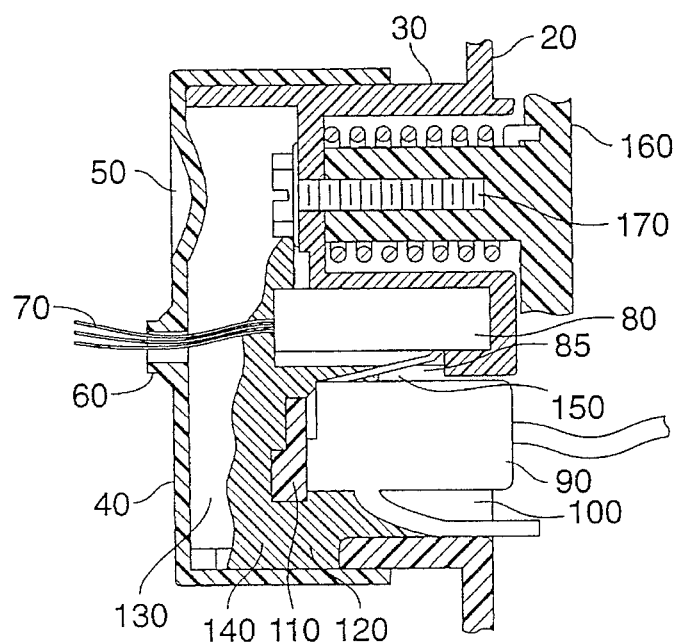
FIG. 2 is cross-sectional view of the RJ11 wall socket of FIG. 1, taken through line 2—2.

Shown in FIG. 2 is a partly cut-away cross-sectional view of the RJ11 wall socket of FIG. 1, taken through line 2—2. As shown, wires 70 attach to a spring-block or "Jack-head" 80, which includes wire contacts 85. An RJ11 plug 90 is shown inserted into a socket 100 until abutting a bridge 110, so as to form an electrical connection with the contacts 85. Beneath the bridge 110 is shown a passage 120 which couples the socket 100 to a rear cavity 130 formed by the socket housing 30 and the elastomeric containment diaphragm 40.

In order to protect the electrical contacts from moisture and other corrosives, an environmental sealant 140 is disposed within the socket 100, the coupling passage 120, and the cavity 130. The environmental sealant is preferably a hydrophobic dielectric designed to exclude moisture and insulate the wires and contacts. Gels are preferred, with the most preferred being silicone gels. The preferred gels have a cohesiveness greater than their tack (adhesion to other surfaces), so that when the plug is removed from the socket, the gel will release the plug rather than separating from the main body of gel within the socket. The gel requires a sufficient adhesion, however, so that it will form an acceptable seal around the contacts, wires, and other portions of the apparatus in need of environmental protection.

The sealant should have a hardness sufficient to provide lasting protection against environmental contaminants. On the other hand, the sealant should be soft enough to be displaced by the plug and conform to the shape of the socket assembly and adequately seal it. The gel's hardness also impacts a customer preference: an audible "click" when the RJ11 plug is fully inserted and latches into the RJ11 socket. If the sealant is too stiff, this click will be muted.

The sealant's elasticity is also an important characteristic, as it enables return of the sealant to protective placement when the plug is removed.

A wide variety of sealants are available for this use, including, for example, elastic hot melt materials, greases, and flexible epoxies. Preferably, the sealant is a dielectric gel such as an oil or plasticizer extended aliphatic urethane gels, urea gels, silicone gels, and thermoplastic gels like styrene-ethylene-butylene-styrene or styrene-ethylene-propylene-styrene, or other soft gels having the required properties below whether or not oil or plasticizer extended, including those disclosed in U.S. Pat. Nos. 4,634,207; 4,600,261; 4,643,924; 4,865,905; 4,662,692; 4,595,635; 4,680,233; 4,716,183; 4,718,678; 4,777,063; and 4,942,270, which are completely incorporated herein by reference for all purposes. Yet another preferred gel is Dow Sylgard gel.

Preferred gels used in conjunction with the present invention include those having a cone penetration value from about 50 to about $350\times10^{-1}$ mm, more preferably about 100 to about $300\times10^{-1}$ mm, and most preferably about 100 to about $250\times10^{-1}$ mm. Preferred gels also have an ultimate elongation of at least about 50%, more preferably at least about 100% to 200%, and most preferably between about 400% and 800%. Alternatively from cone penetration, another measurement for hardness is Voland hardness. The Voland hardness is generally measured on a Voland texture analyzer apparatus. Voland hardnesses from about 15 grams to at least about 50 grams are acceptable for the gel, with preferred gels having Voland hardnesses from about 20 to about 40 grams.

In the embodiment of FIGS. 1 and 2 the preferred environmental sealant is a silicone gel having a Voland hardness of about 31±6 grams, a stress relaxation of about 28±10%, and a tack of about 17±5 grams. The cavity 130, the coupling passage 120, and any interior spaces or cavities of the RJ11 plug 90 are preferably substantially completely filled with the sealant 140. The socket 100 is also preferably substantially filled with the sealant 140, or at least sufficiently filled so as to cover the contacts 85 when no RJ11 plug is inserted.

When the plug 90 is inserted into the socket 100, it will displace some of the sealant 140. The displaced sealant flows through the coupling passage 120 to the cavity 130. The pressure of the displaced sealant causes the inset dimple 50 to deflect outward and accommodate the additional sealant. The containment diaphragm 40 is preferably made of a flexible material such as rubber, most preferably Santoprene rubber made by MonSanto Corp. Other acceptable materials include flexible plastic, rubberized cloth, or essentially any flexible material that can be formed into a diaphragm or membrane. The containment diaphragm 40 is flexible enough to make room for sealant displaced by the insertion of the RJ11 plug 90, but it preferably is also stiff enough to create a force urging the sealant back into the socket 100 when the plug 90 is removed, so that the sealant covers and protects the contacts 85. This force also places the sealant under pressure when the plug 90 is inserted, and this pressure further helps to keep out corrosive contaminants. Preferably, the diaphragm 40 has a Shore A hardness of about 20 grams to about 100 grams, more preferably about 45 grams to about 75 grams, and most preferably a hardness of about 55 grams to about 65 grams. The diaphragm 40 also works in conjunction with the sealant to provide a seal around the wires 70 as they exit the socket assembly. Many prior systems have had difficulty sealing even one wire in such a situation, let alone four, but the combination of the diaphragm and gel seals up to eight or more wires. This sealing of the wires could also be achieved by the diaphragm in conjunction with some other environmental sealant, such as a grease, rather than the gel, but such sealing is inferior after repeated reentries.

Another feature of the invention to enhance the sealant surrounding and protecting the contacts 85 includes on a portion of contacts 85 a coating 150 having a bonding affinity for the sealant. The contacts 85 are preferably gold coated, and sealants tend not to stick well to the gold. The coating 150 is applied to the front portion of the contacts 85. The coating 120 preferably forms a strong bond with the contacts 85, and also is preferably adhesive to the sealant 140. For gels, a suitable material is a tacky or adhesive base component of the gel. In this way, when the plug 90 is inserted, a portion of the gel remains attached to the front of the contacts 85; the gel is stretched and the main portion of it is pushed in front of the plug 90, but thin strands remain attached. When the plug 90 is then removed, the gel will contract and be pulled back to the front of the contacts 85, thereby protecting them. A sufficient portion of the contacts 85 must be free of the coating so that the contacts 85 may form electrical connections with any corresponding contacts in the plug 90. In the preferred embodiment the coating 150 is a silicone rubber adhesive that is applied to the contacts 85; this may be Dow Corning RTV silicone rubber sold as Silastic T silicone rubber, having a hardness of 20 as reported by Dow Corning.

Preferably, the coating 150 is applied to the contacts 85 at a preliminary stage of construction, such as prior to insertion of spring-block 80 into socket housing 30, and allowed to harden. The socket assembly may then later filled with silicone gel. The gel, as it cures, will bond with the coating. Of course, essentially any material that forms a good bond both with the contacts and with the sealant may be used for the coating. The coating also performs the useful function of sealing the holes of contacts 85 to their plastic holder. For this purpose the coating does not need to bond with the gel.

Yet another feature shown in FIG. 2 is a spring loaded dust cover 160 (partially shown) that pivots about screw 170 so as to cover socket 100 when plug 90 is removed.

Figure 3:
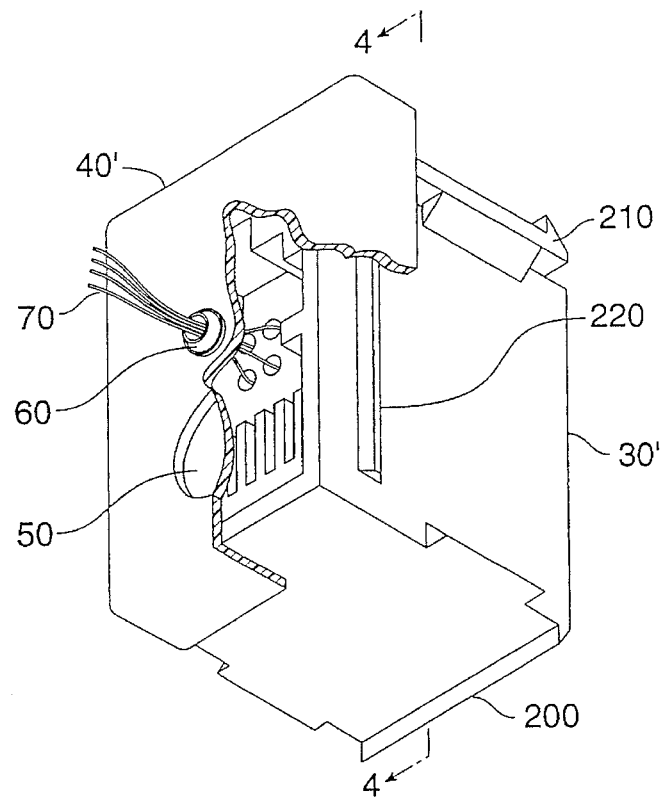
FIG. 3 is a cutaway perspective view of a modular RJ11 socket according to an aspect of the present invention.
Figure 4:
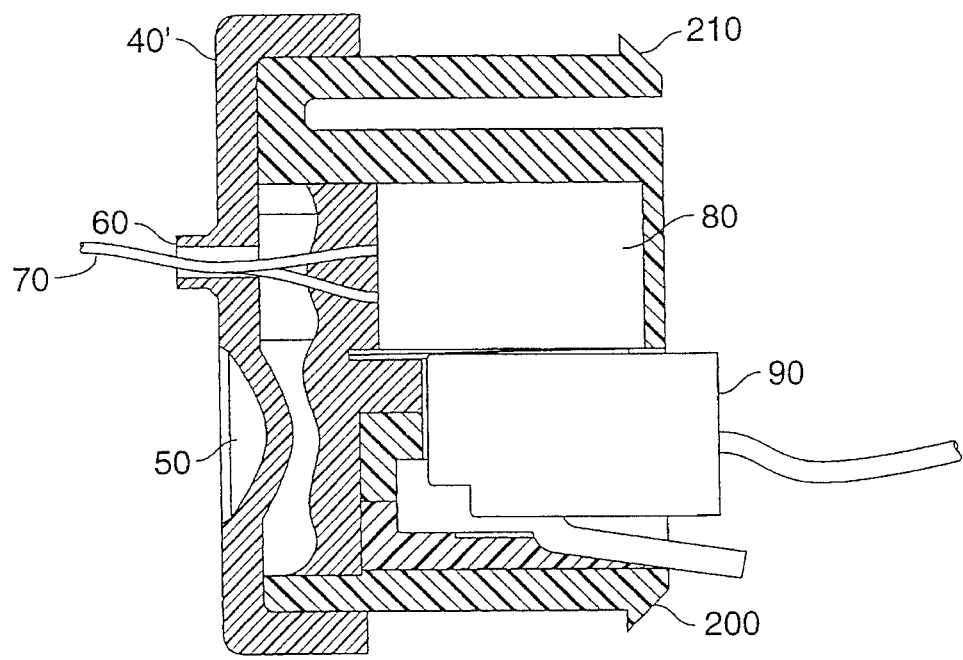
FIG. 4 is cross-sectional view of the modular socket of FIG. 3, taken through line 4—4.

An additional embodiment is illustrated in FIGS. 3 and 4, in which corresponding reference numerals indicate features corresponding to those of FIGS. 1 and 2. FIG. 3 is a partially cutaway perspective view of a modular RJ11 socket housing 30'. The socket housing 30' is shown to have two attachment lips 200 and 210, for snapping the socket housing 30' into a socket faceplate (not shown). The socket housing 30' is also shown to have a ridge 220 which helps secure diaphragm 40'. FIG. 4 is cross-sectional view of the modular socket of FIG. 3, taken through line 4—4. This view shows that the attachment lip 210 is an extended member that can deflect to allow the socket housing 30' to snap fit into a socket faceplate.

Figure 5A:
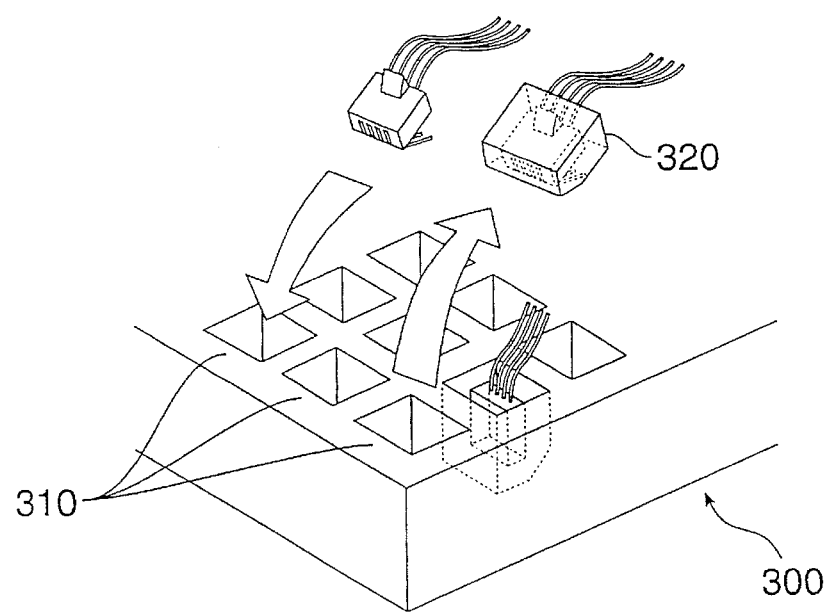
FIGS. 5A and 5B illustrate embodiments of a process of encapsulating a spring-block with gel prior to insertion in a socket housing, according to one aspect of the present invention.
Figure 5B:
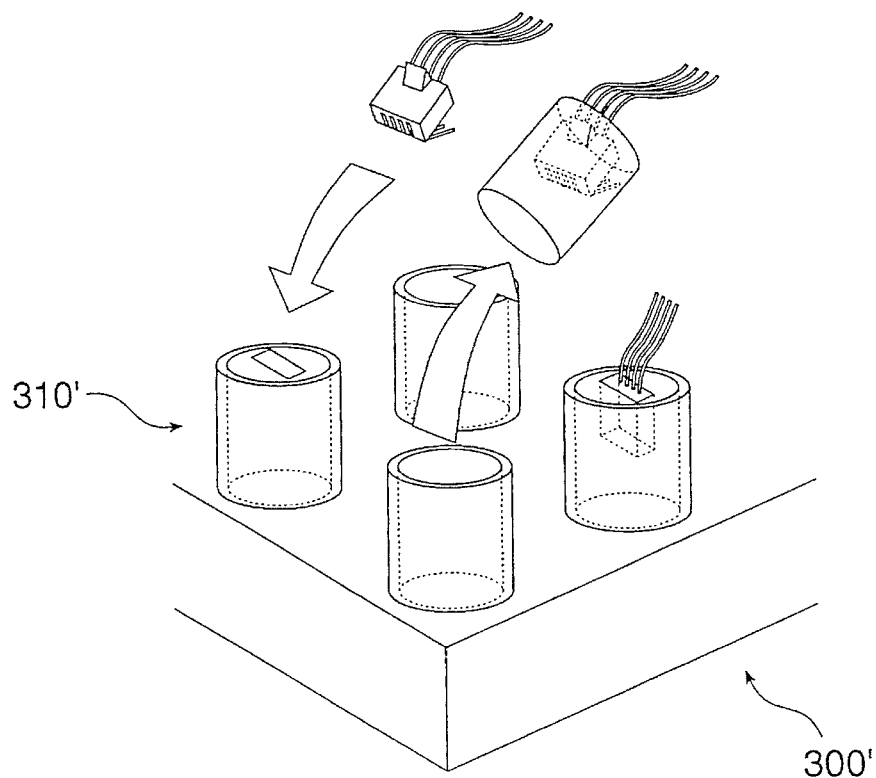

The sealant may be provided by filling the socket housing as discussed above, or by surrounding the spring-block with sealant prior to inserting the spring-block into the socket housing. The latter approach both simplifies manufacturing and reduces costs, and is illustrated in FIGS. 5A and 5B. As shown in FIG. 5A, gel curing fixture 300 has a plurality of rectangular spring-block receptacles 310. A spring-block, complete with wires and contacts, is inserted into a receptacle 310, which is then filled with gel. Once the gel has been cured and is affixed to the spring-block, the spring-block is removed, resulting in a gel-encased spring-block such as indicated by reference numeral 320. Differently shaped receptacles may also be employed, as shown in FIG. 5B, which illustrates a gel curing fixture 300' that has a plurality of cylindrical spring-block gel molding receptacles 310'. The dimensions of the shape of gel are at least about 10% greater than the plug, preferably at least about 25% greater than the plug, and most preferably about 50% greater than the plug, but less than a larger dimension that would preclude the plug's insertion.

Figure 6A:
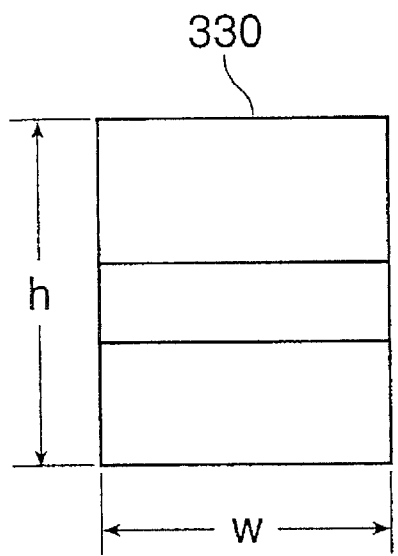
FIGS. 6A and 6B illustrate a particular embodiment of a gel-encased spring-block according to one aspect of the present invention.
Figure 6B:
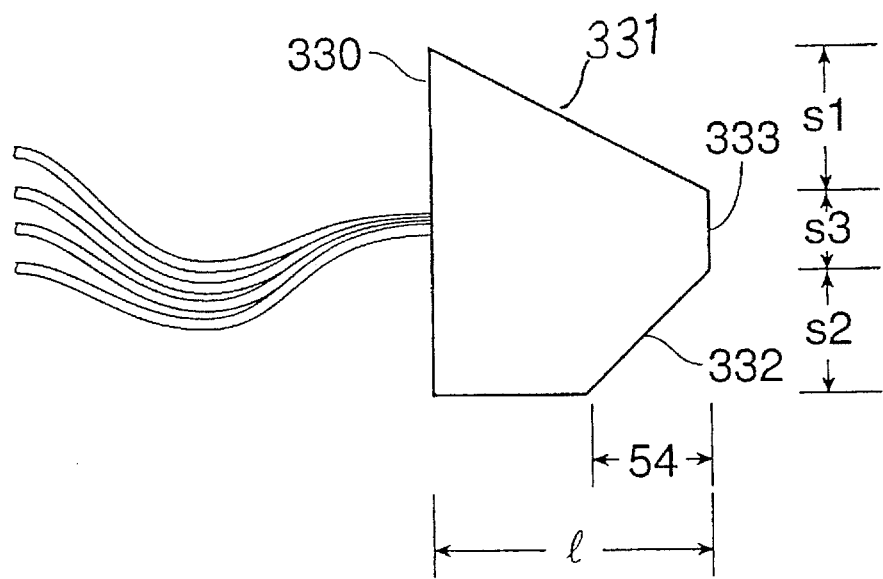

Because of the large variance in shape of currently existing socket housings, the most suitable outside dimensions for gel-encased spring-blocks will also vary. The general shape of a preferred gel-encased spring-block is illustrated in FIGS. 6A and 6B, which show a front view and side view, respectively, of a gel-encased spring-block 330. Gel-encased spring-block 330 is generally block-shaped, with a top-front sloping surface 331 extending from the front to the rear, and a lower-front sloping surface 332 extending from the front to a midpoint towards the rear, with a flat front portion 333. The spring-block is totally encased by gel, and its features are therefore not shown, although the contacts should be understood to travel from the front, down and towards the rear. In some embodiments top-front sloping surface 331 will meet lower-front sloping surface 332 at an edge, without any flat front portion 333.

Gel-encased spring-block 330 can in this case be described generally by a height h, width w, length l, vertical extent s1 of surface 331, vertical extent s2 of surface 332, vertical extent s3 of surface 333, and lengthwise extent s4 of surface 332. For a majority of RJ11 socket housings, suitable dimensions for a gel encased spring block will be with height ranging from about 0.5 inches to about 0.8 inches, width ranging from about 0.3 inches to 0.65 inches, length ranging from about 0.5 inches to about 0.73 inches, s1 ranging from about 0.05 inches to about 0.3 inches, s2 ranging from about 0.27 inches to about 0.45 inches, s3 ranging from about 0.0 inches to about 0.23 inches, and s4 ranging from about 0.18 inches to about 0.33 inches. For a silicone gel having the most preferred parameter ranges discussed above, this results in about 1.6±0.05 grams of gel encapsulating the spring-block.

Figure 7A:
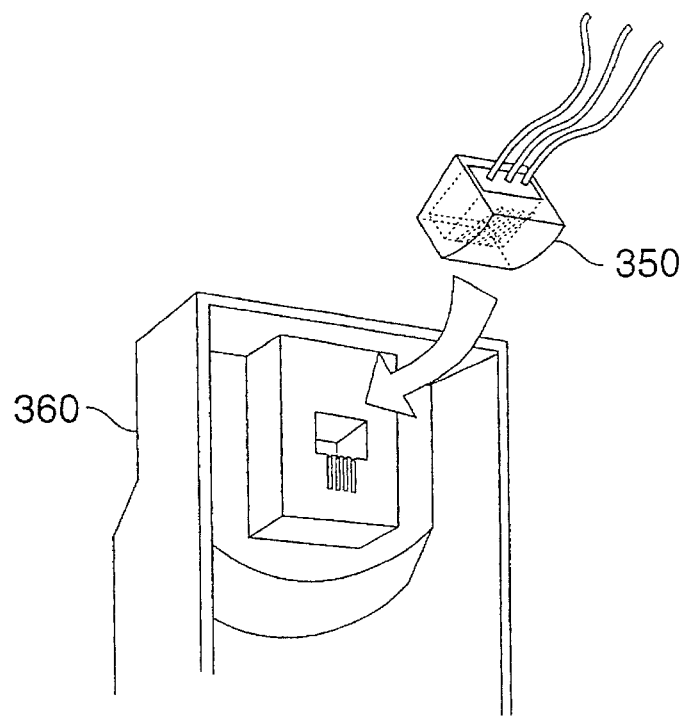
FIGS. 7A, 7B, 7C, and 7D illustrates two particular embodiments of gel encased spring-blocks being inserted into different socket housings.
Figure 7B:
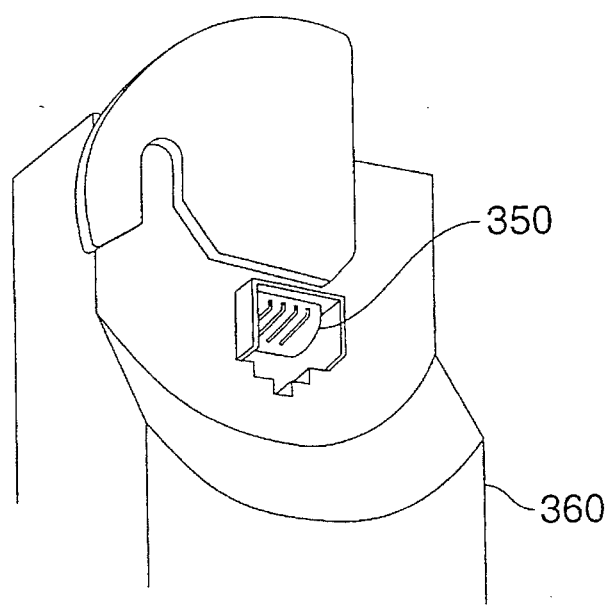
Figure 7C:
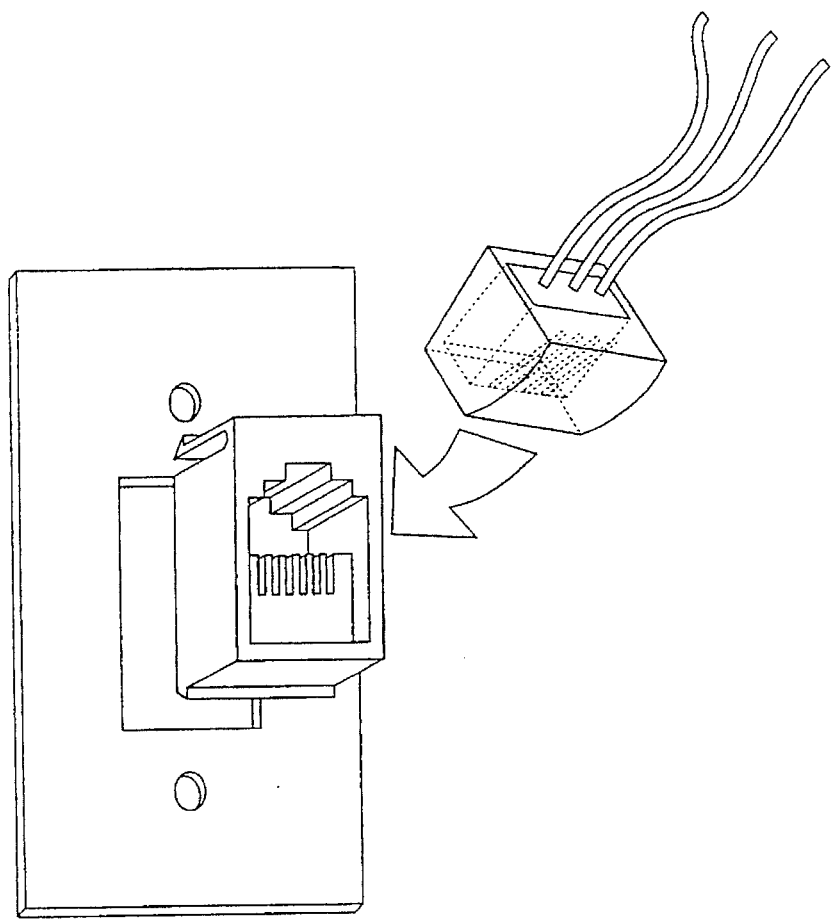
Figure 7D:
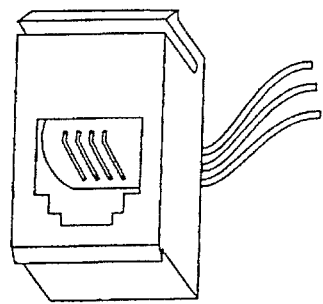

FIGS. 7A, 7B, 7C, and 7D illustrates two particular embodiments of gel encased spring-blocks being inserted into different socket housings. FIG. 7A shows a rear view of an gel-encased spring-block 350 being inserted into an RJ11 socket 360. FIG. 7B shows a front view of RJ11 socket 360 after gel-encased spring-block 350 is inserted. FIG. 7C shows a rear view of a gel encased spring-block 370 being inserted into a modular RJ11 socket 380, and FIG. 7D shows a front view of modular RJ11 socket 380 after gel-encased spring-block 370 is inserted.

Figure 8A:
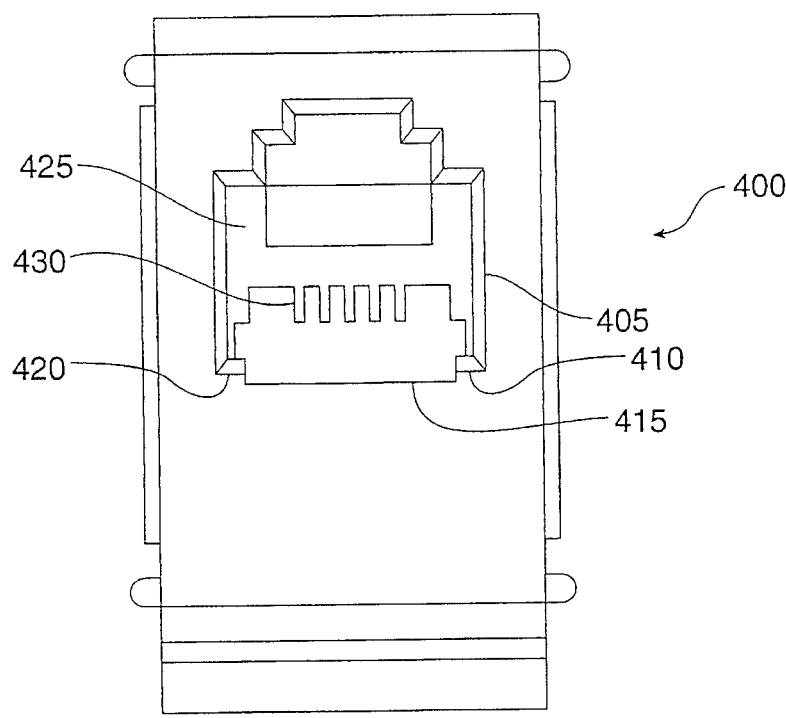
FIG. 8A is a front view of an RJ11 socket housing modified according to an aspect of the present invention for improved gel sealing.

FIG. 8A is a front view of an RJ11 socket housing modified according to an aspect of the present invention for improved gel sealing. RJ11 socket housing 400 is shown with socket opening 405, for an RJ11 plug, facing forward. Socket opening 405 has been modified so that lower edge 410, which is adjacent to the spring block and contacts when inserted, has a central notch 415 extending along most of its length and about 0.035 inches deep, leaving corner spacers 420. In an unmodified RJ socket filled with gel, the gel has a tendency to press up against lower edge 410 of opening 405, so that the insertion of a plug will tend to shear the gel against edge 410. As the gel is sheared, repeated insertions of a plug will tend to push it back with no elastic connection to the gel at the front of the spring block, causing the gel to be "rolled back" and not return to its protective positioning over the front of the spring block contacts after the plug is removed. The inclusion of notch 415, with spacers 420 to maintain an inserted plug in its standard position, provides a space between the plug and housing edge, which reduces the shearing effect on the gel and improves its performance over repeated insertions and removals of a plug. Also shown in FIG. 8A is internal comb 425 with teeth 430 that maintain in place the contacts of an inserted spring block. Teeth 430 have been shortened in comparison to other designs, to about 0.05 inches, to allow a better passage for gel to flow out of and back into the socket as a plug is inserted and removed. Also, the number of teeth has been reduced. For a number n of wires, only n+1 teeth are necessary to hold them in place. Reducing the number of teeth has a similar effect to the shortening of the teeth, and improves the passage for the flow of gel.

Figure 8B:
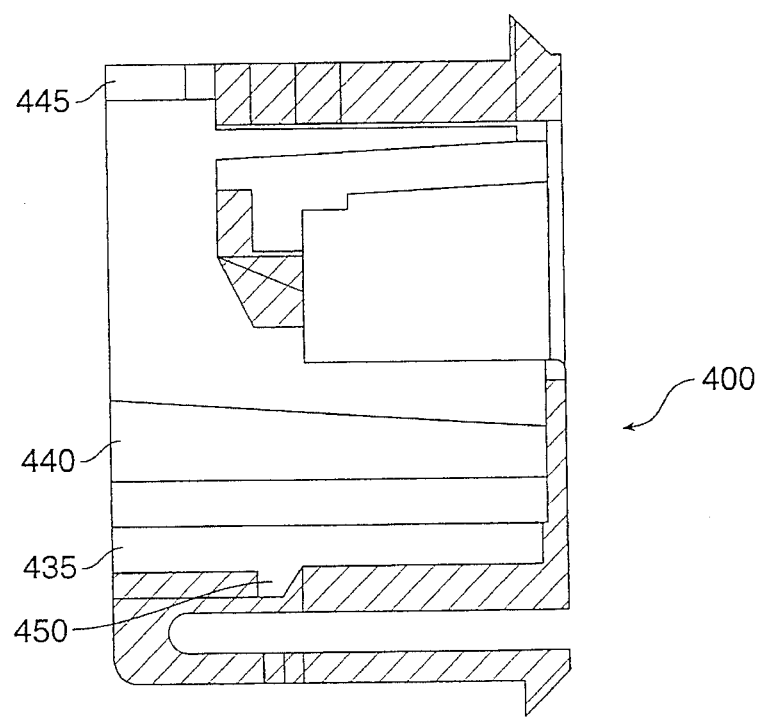
FIG. 8B is a cut-away side view of the RJ11 socket housing of FIG. 8A.

FIG. 8B is a cut-away side view of the RJ11 socket housing of FIG. 8A. This view shows a socket housing sidewall spacer 435 for supporting the bottom of an inserted spring block, and socket housing sidewall slot 440 for engaging with a spring block side ridge. These features control the elevation of the inserted spring block, and have been modified to be about 0.05 inches lower than normal. Wire slot 445 is cut into the rear top side of socket housing 400, to hold wires from an inserted spring-block. Also shown in FIG. 8B is spring block latch 450, which has been modified from previous designs to be a notch rather than a simple step, so it controls both forward an rearward movement of an inserted spring block rather than simply preventing rearward movement of an inserted spring block.

Figure 8C:
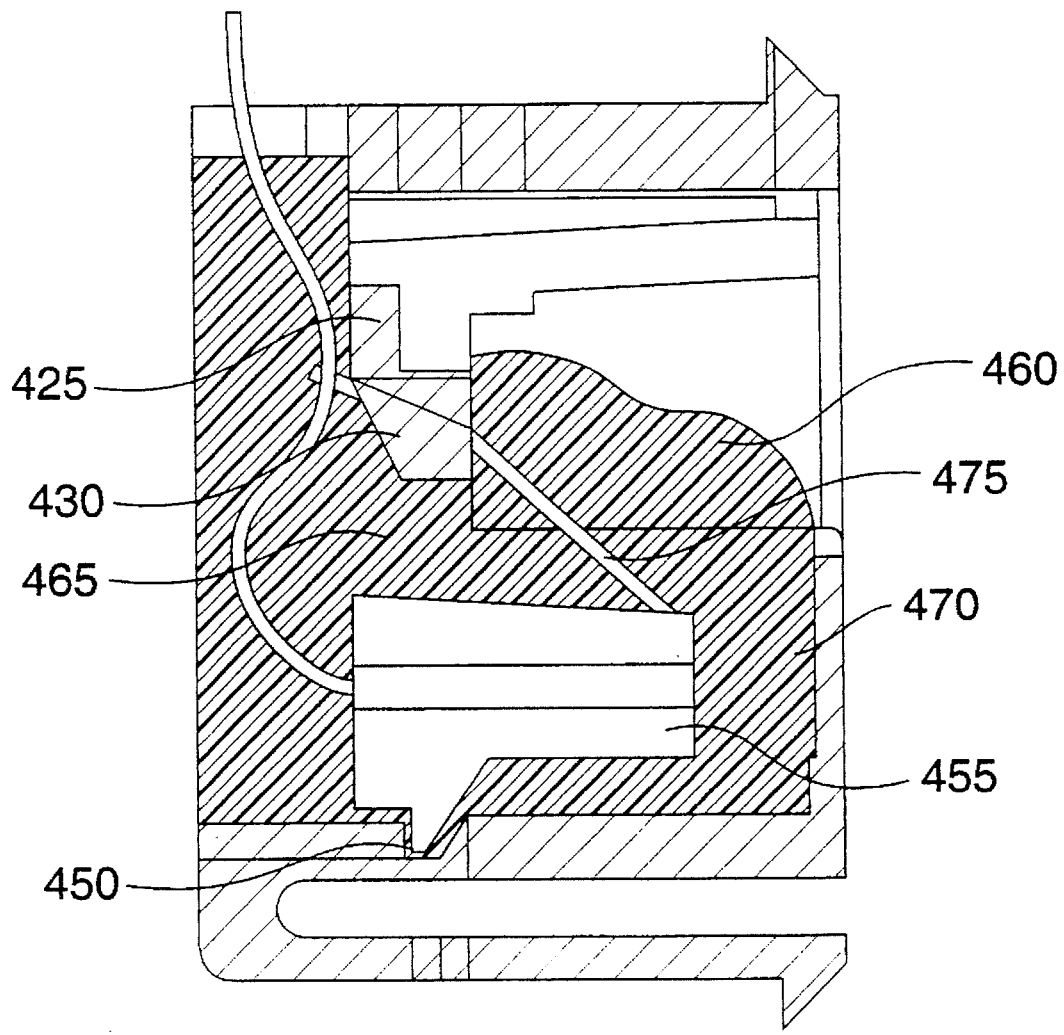
FIG. 8C is a cut-away side view of the RJ11 socket housing of FIG. 8A with a gel encapsulated spring block inserted.

The significance of these modifications is illustrated in FIG. 8C, which is a cut-away side view of RJ11 socket housing 400 in which a spring block 455, encapsulated with gel 460, is inserted. The shorter teeth 430 of comb 425, together with the lowered position of spring block 455 create a passage 465 through which gel may flow when a plug is inserted or removed. Furthermore, notch 450 is positioned so as to distance spring block 455 from the front of socket housing 400, creating a well 470 filled with gel. This well 470 of gel helps maintain an elastic connection between gel at the front of spring block 455 with gel that has been pushed back by an inserted plug, so that when the plug is removed the displaced gel is pulled into place over contacts 475. Well 470 is preferably between about 0.1 and 0.2 inches, most preferably about 0.12 inches.

Figure 9:
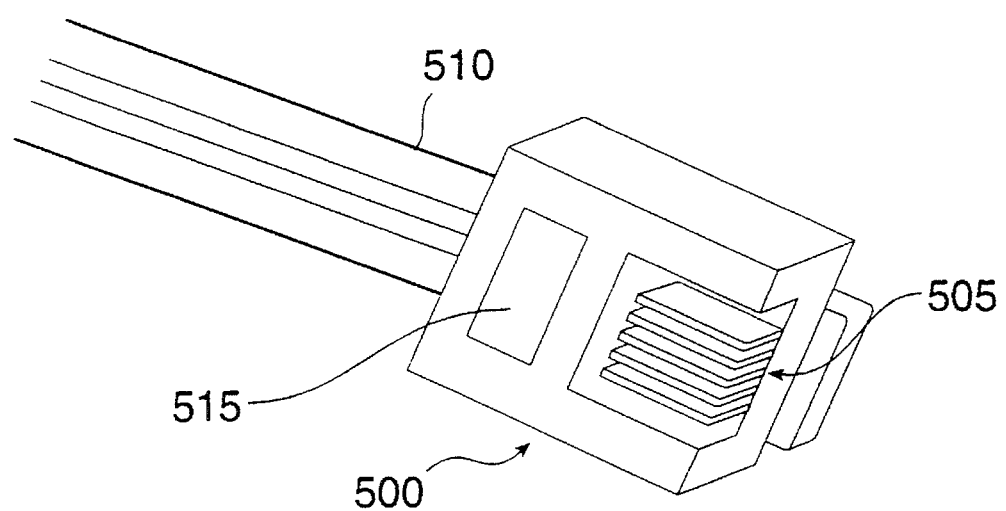
FIG. 9 is a perspective view of an RJ11 plug according to an aspect of the present invention.

Illustrated in FIG. 9 is an RJ11 plug for forming a completed telephone connection according to an aspect of the present invention. RJ11 plug 500 having contacts 505 is filled with gel, which is then cured. Either before or after curing the gel, wires 510 are inserted and pressure is applied at crimp point 515 to secure wires 510 within plug 500. RJ11 plug 500 has three points that need to be sealed to provide environmental protection: contacts 505, the entry point for wires 510, and crimp point 515. The filling of plug 500 with gel serves to seal the entry point for wires 510 and also seals crimp point 515. Upon being inserted into a gel filled socket, contacts 505 will also be sealed, providing a completely environmentally sealed telephone connection.

Figure 10:
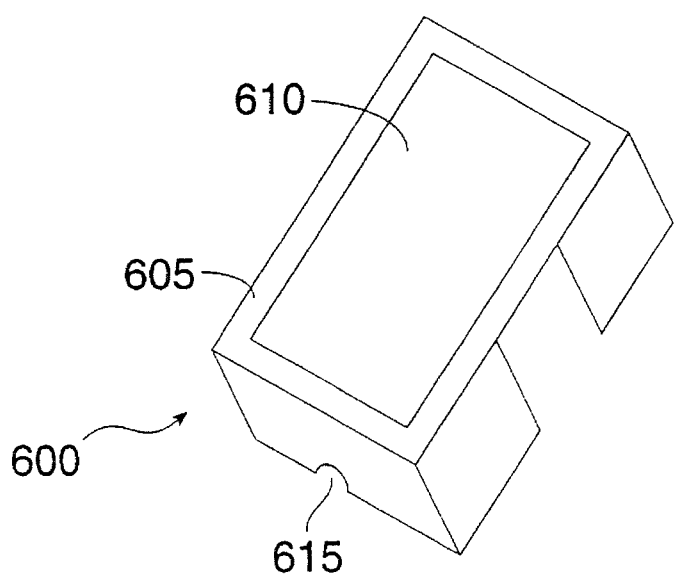
FIG. 10 is a perspective view of a particular embodiment of a diaphragm for attachment to the back of a RJ11 socket housing.

Illustrated in FIG. 10 is an alternative embodiment of an elastic diaphragm for attachment to the back of a RJ11 socket housing according to the present invention. Diaphragm 600 is made of a rectangular plastic frame 605, on the inside of which is attached an elastic membrane 610. According to a preferred embodiment, membrane 610 is a double sided foam tape that bonds both with frame 605 and with the socket housing when attached. Diaphragm 600 also has a slide slot which may be matched to a wire slot in the socket housing, for securing and sealing the wires. Diaphragm 600 may also have internal ridges that couple with ridges on the sides of the socket housing to hold it firmly in place.

The inventions claimed herein provide a substantially improved method and device for environmentally protecting electrical socket connections. It is to be understood that the above description is intended to be illustrative and not restrictive. Many embodiments will be apparent to those of skill in the art upon reviewing the above description. By way of example, the inventions herein have been illustrated primarily with regard to RJ11 telephone sockets, but teachings herein can also be applied to other RJ type telephone sockets such as RJ14 and RJ48 sockets, and to other electrical socket connections, such as power outlet sockets in a high humidity area such as an oil rig. By way of further example, the specific embodiments described herein have employed diaphragms surrounding the circumference of the socket and mounted directly opposite the entry point of the plug, but both of these characteristics could be varied. By way of still further example, the specific connectors and the roles of the male and female connectors disclosed herein could readily be reversed or altered. The scope of the inventions should, therefore, be determined not with reference to the above description, but should instead be determined with reference to the appended claims, along with the full scope of equivalents to which such claims are entitled by the ordinary skilled artisan.

What is claimed is:

1. A sealed plug comprising:
   a plug encapsulated in and by a sufficient quantity of shaped gel having an elongation of at least about 100% and a Voland gram hardness of about 15–50 grams such that said gel surrounds the plug and is capable of sealing at least a second plug upon the connection of the two plugs through the use of a mating socket, said shaped gel having a substantially cylindrical shape.

2. A sealed plug comprising:
   a plug encapsulated in and by a sufficient quantity of shaped gel having an elongation of at least about 100% and a Voland gram hardness of about 15–50 grams such that said gel surrounds the plug and is capable of sealing at least a second plug upon the connection of the two plugs through the use of a mating socket, said shaped gel being substantially block-shaped and further comprising a top-front sloping surface extending from the front to the rear, a lower-front sloping surface extending from the front to a midpoint towards the rear, and a flat front portion.

* * * * *